(12) United States Patent
Okuyama et al.

(10) Patent No.: US 7,726,279 B2
(45) Date of Patent: Jun. 1, 2010

(54) REMOTE CONTROL SYSTEM OF AN INTERNAL COMBUSTION ENGINE FOR A BOAT

(75) Inventors: Takashi Okuyama, Hamamatsu (JP); Isao Kanno, Hamamatsu (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 621 days.

(21) Appl. No.: 11/694,587

(22) Filed: Mar. 30, 2007

(65) Prior Publication Data

US 2007/0246010 A1 Oct. 25, 2007

(30) Foreign Application Priority Data

Apr. 21, 2006 (JP) ............................. 2006-117759

(51) Int. Cl.
*F02M 51/00* (2006.01)
*F02D 11/10* (2006.01)
*B63H 21/22* (2006.01)

(52) U.S. Cl. ........................... 123/397; 123/479; 440/84

(58) Field of Classification Search ................. 123/397, 123/396, 395, 399, 350, 352, 479; 440/84, 440/88

See application file for complete search history.

(56) References Cited

U.S. PATENT DOCUMENTS

| 7,089,910 B2 * | 8/2006 | Kanno et al. ................. 123/396 |
| 7,343,899 B2 * | 3/2008 | Kanno et al. ................. 123/396 |
| 7,507,130 B2 * | 3/2009 | Watanabe et al. ............. 440/84 |

FOREIGN PATENT DOCUMENTS

JP          61-278489        12/1986

\* cited by examiner

*Primary Examiner*—Hieu T Vo
(74) *Attorney, Agent, or Firm*—Keating & Bennett, LLP

(57) ABSTRACT

An electronic control device on an internal combustion engine side connected to an abnormal internal combustion engine detects an abnormality and outputs the abnormal signal; the target throttle opening angle signal is transmitted to the electric throttle actuator to set a throttle opening angle of an abnormal internal combustion engine to a predetermined opening angle; the abnormal signal is transmitted to the electronic control devices on a remote control device side of a normal internal combustion engine; and the electronic control devices on a remote control device side of a normal internal combustion engine, on receiving the abnormal signal, transmit the target throttle opening angle signal to the electronic control devices on an internal combustion engine side of a normal internal combustion engine.

19 Claims, 4 Drawing Sheets

REMOTE CONTROL SYSTEM OF AN INTERNAL COMBUSTION ENGINE FOR A BOAT

BACKGROUND OF THE INVENTION

1. Field of the Invention

The present invention relates to an internal combustion engine, and more particularly, to a remote control system of an internal combustion engine.

2. Description of the Related Art

When an abnormality occurs in an internal combustion engine in a propulsion unit on a boat equipped with a plurality of propulsion units, the engine can be configured such that an engine speed of the engine (i.e., engine speed) is reduced in response to the abnormality to prevent overheating of the engine. If an engine in a propulsion unit in a normal condition is operated in the same state, the engine speed the normal engine and the abnormal engine can become unbalanced and operation stability can deteriorate.

When an attempt is made to reduce the engine speed of the abnormal internal combustion engine, there can be a case where a propeller of the internal combustion engine is forcefully rotated by a water flow, so that the engine speed is not reduced to a target low speed.

In Patent Document JP-B-Hei 6-33074, a control system that reduces both of the engine speed an internal combustion engine having caused an abnormality and the engine speed of a normally operating other internal combustion engine is proposed. In this system, an abnormality detector, when an abnormality occurs in an internal combustion engine in any propulsion unit of two propulsion units, detects an abnormality to reduce the engine speed of an internal combustion engine by operating an abnormality warning device installed to an internal combustion engine having caused the abnormality, while an abnormality warning detector installed to a normally operating internal combustion engine is operated to reduce the engine speed of a normally operating internal combustion engine, preventing a forceful rotation.

As illustrated in FIG. 4, a conventional control system of an internal combustion engine can have a right side control system 50R to give a warning against an abnormality of an internal combustion engine in a right side propulsion unit and a left side control system 50L to give a warning against an abnormality of an internal combustion engine in a left side propulsion unit. So-called mechanical type remote operation system has a propulsion unit and a remote control device connected by a connector such as a cable, and the control systems 50R, 50L include the abnormality detector 51R, 51L, the controller 52R, 52L, the abnormality warner 53R, 53L, and the warning canceller 54R, 54L.

The abnormality detector 51R, 51L include the overheating detection circuits 55R, 55L to detect overheating of an internal combustion engine and the oil reduction detection circuits 56R, 56L to detect oil reduction.

In addition, the abnormality warner 53R, 53L include buzzers 57R, 57L to give a warning when oil reduction or overheating is detected, the lamps 58R, 58L to give a warning when oil reduction is detected, and the engine speed reduction circuits 59R, 59L to give a warning by reducing an engine speed of an internal combustion engine when oil reduction or overheating is detected by these detection circuits.

Moreover, the controller 52R, 52L have the warning signal output circuits 60R, 60L to output a warning signal to give a warning to a an internal combustion engine side of the other propulsion unit based on an abnormality detecting signal from the overheating detection circuits 55R, 55L or the oil reduction detection circuits 56R, 56L. A warning signal output by these warning signal output circuits 60R, 60L is entered into the warning signal input circuits 61R, 61L on the other internal combustion engine side, and the state is retained in the retaining circuits 62R, 62L. This simultaneously operates the engine speed reduction circuits 59R, 59L of an internal combustion engine in a normal propulsion unit, reducing an engine speed of an internal combustion engine and operating the buzzers 57R, 57L to warn an operator.

For example, when an internal combustion engine in the right side propulsion unit is overheated or the amount of oil becomes smaller than a standard amount, the overheating detection circuits 55R detects overheating or the oil reduction detection circuits 56R detects oil reduction, and the buzzer 57R and the lamp 58R operate to inform an operator of the abnormality. If the overheating detection circuit 55R or the oil reduction detection circuits 56R operates, the operation signal is transmitted to the engine speed circuit 59R of the internal combustion engine in an abnormal right side compulsion system and the engine speed reduction circuit 59L of the internal combustion engine in a normal left side compulsion system. The signal transmitted from the engine speed reduction circuits 59R, 59L makes spark plugs of the internal combustion engine in the abnormal right side propulsion unit and an internal combustion engine in a normal left side propulsion unit fail, reducing an engine speed of each internal combustion engine.

In some cases where a mechanical type remote operation system is used, each electronic control device connected to an internal combustion engine in a plurality of compulsion systems is connected to each other by a controller area network (CAN) which is internationally standardized. When an abnormality occurs in an internal combustion engine in any of propulsion units, if an electronic control device connected to the abnormal internal combustion engine detects an abnormality, it makes a spark plug of its internal combustion engine fail based on the abnormal signal, and the abnormal signal is transmitted to an electronic control device connected to the other normal internal combustion engine to make a spark plug of a normal internal combustion engine fail, so that an engine speed of each internal combustion engine is reduced.

SUMMARY OF THE INVENTION

In the above, a control system having of a dedicated circuit connected to an internal combustion engine of a propulsion unit and a control system connecting each electronic control device connected to an internal combustion engine in a plurality of propulsion units to each other by a CAN are adopted. They are used for a mechanical type remote operation system with a propulsion unit and a remote control device connected by a mechanical cable, where a method is adopted to reduce an engine speed of the internal combustion engine by making a spark plug of an internal combustion engine fail.

However, because an expensive dedicated circuit is required for a case where a control system with a dedicated circuit connected to an internal combustion engine in a propulsion unit is adopted, the cost of a boat is increased. In addition, a problem is that the control of reducing an engine speed of an internal combustion engine by making a spark plug fail is more difficult than a method that adjusts a throttle opening angle.

To solve problems caused by the above control system of an internal combustion engine, embodiments realize a high response control by a simple structure and provide a remote control system of an internal combustion engine to reduce engine speed of internal combustion engines in abnormal and normal propulsion units when an abnormality such as overheating and oil reduction occurs in one internal combustion engine in a plurality of propulsion units installed to a boat. The embodiments also provide a boat equipped with the remote control system.

An embodiment provides a remote control system of an internal combustion engine for a boat comprising an electronic control device and a remote control device. The electronic control device on an internal combustion engine side is installed to each internal combustion engine for controlling an operation of a throttle actuator of an internal combustion engine for each propulsion unit, an operation of a shift actuator, and an ignition timing of a spark plug of a boat equipped with a plurality of propulsion unit. The remote control device has electronic control devices, which can communicate with each other, on a remote control device side corresponding to the same number of electronic control devices on the internal combustion engine side and capable of transmitting a signal for each internal combustion engine to execute a target drive state. When an abnormality such as overheating and oil reduction in an internal combustion engine in any propulsion unit occurs, the electronic control device on the internal combustion engine side connected to an abnormal internal combustion engine detects the abnormality and outputs an abnormal signal, transmitting a target throttle opening angle signal to the throttle actuator to set a throttle opening angle of an abnormal internal combustion engine to a certain small opening angle. The abnormal signal is transmitted to an electronic control device on the remote control device side of a normal internal combustion engine via an electronic control device on the remote control device side of the abnormal internal combustion engine. An electronic control device on a remote control device side of a normal internal combustion engine, on receiving the abnormal signal, transmits the target throttle opening angle signal or the abnormal signal to an electronic control device on the internal combustion engine side of a normal internal combustion engine, thereby, engine speed of the abnormal internal combustion engine and the normal internal combustion engine are reduced to a certain low speed.

Another embodiment provides a remote control system, in which an electronic control device on the internal combustion engine side has an actuator control device to control an operation of a throttle actuator and a shift actuator, and an engine controller to control an ignition timing of a spark plug. When receiving the abnormal signal from the engine controller, the actuator control device compares a target throttle opening angle corresponding to the target throttle opening angle signal and a throttle opening angle of an abnormal internal combustion engine, and, if the two throttle opening angles are different, the throttle actuator is operated to change a throttle opening angle of an abnormal internal combustion engine to the target throttle opening angle.

Still another embodiment provides a remote control system, in which when receiving the abnormal signal, an electronic control device on the remote control device side compares a target throttle opening angle and a throttle opening angle of a normal internal combustion engine, and, if the two throttle opening angles are different, a target throttle opening angle signal is transmitted to the actuator control device to set a throttle opening angle to the target throttle opening angle, so that the actuator control device operates the throttle actuator to change a throttle opening angle of a normal internal combustion engine to the target throttle opening angle.

Still another embodiment provides a remote control system, in which when receiving the abnormal signal, an electronic control device on the remote control device side operates a warming buzzer installed in the remote control device or in the vicinity of it, and issues the target throttle opening angle signal to control the engine speed of the internal combustion engine.

Still another embodiment provides a remote control system, in which the cancel conditions to cancel a restricted mode state of the throttle actuator having received the abnormal signal are a solution to an abnormality of an internal combustion engine causing the abnormal signal and the operation lever is positioned in the neutral position or in a low speed position corresponding to a target throttle opening angle.

Still another embodiment provides a remote control system, in which when receiving the abnormal signal from the engine controller, the actuator control device operates the shift actuator to set a shift of an abnormal internal combustion engine to the neutral position based on the abnormal signal.

Still another embodiment provides a boat having a remote control system of an internal combustion engine.

In an embodiment, an electronic control device on an internal combustion engine side connected to an abnormal internal combustion engine detects an abnormality and outputs an abnormal signal, transmits a target throttle opening angle signal to set a throttle opening angle of an abnormal internal combustion engine to a certain small opening angle to the throttle actuator, and transmits an abnormal signal an electronic control device on the remote control device side of a normal internal combustion engine via an electronic control device on a remote control device side of an abnormal internal combustion engine. An electronic control device on a remote control device side of a normal internal combustion engine, on receiving an abnormal signal, transmits a target throttle opening angle signal or an abnormal signal to an electronic control device on an internal combustion engine side of a normal internal combustion engine, so that engine speed of an abnormal internal combustion engine and a normal internal combustion engine are reduced to a certain small angle. Therefore, a simple and sure control to reduce an engine speed of an internal combustion engine by adjusting a throttle opening angle is realized by a simple modification of software programs of an electronic control device on an internal combustion engine side and an electronic control device on a remote control device side. As a result, an expensive dedicated circuit to realize a complicated ignition failure control is not required, and the cost of adopting a new control method can be reduced. In addition, because it is easy to connect an electronic control device on each remote control device side to each other by a communication circuit and to adopt a dedicated communication protocol, the reliability and response can be enhanced, so that speed of revolution of an internal combustion engine in an abnormal propulsion unit and that of an internal combustion engine in a normal propulsion unit can be reduced promptly and surely.

In another embodiment, when an actuator control device receives an abnormal signal from an engine controller, a target throttle opening angle corresponding to a target throttle opening angle signal and a throttle opening angle of an abnormal internal combustion engine are compared, and, if the two throttle opening angles are different, a throttle actuator is operated to change the throttle opening angle of the abnormal internal combustion engine to the target throttle opening angle. As a result, the engine speed of the abnormal internal combustion engine can be set more promptly and surely to a target low speed because the amount of intake air can be accurately controlled by adjusting the throttle opening angle of the abnormal internal combustion engine to a target value.

In still another embodiment, when receiving an abnormal signal, an electronic control device on a remote control device side compares a target throttle opening angle and a throttle opening angle of a normal internal combustion engine and, if the two throttle opening angles are different, transmits a target throttle opening angle signal to an actuator control device to set the throttle opening angle to the target throttle opening angle, so that an actuator control device operates a throttle actuator to change a throttle opening angle of a normal internal combustion engine to the target throttle opening angle. As a result, an engine speed of the normal internal combustion engine can be set more promptly and surely to a target low speed because the amount of intake air can be accurately controlled by adjusting the throttle opening angle of the normal internal combustion engine to a target value.

In still another embodiment, when receiving an abnormal signal, an electronic control device on a remote control device side operates a warning buzzer installed in a remote control device or in the vicinity of it, and a target throttle opening angle signal controls an engine speed of an internal combustion engine. Therefore, because an engine sound is reduced to the lowest level, for example, by setting a low engine speed used for an idling, an operator does not fail to notice a warning sound from the warning buzzer. An action can be promptly taken to return the abnormal internal combustion engine to a normal state, so that damage to the internal combustion engine can be minimized.

In still another embodiment, the cancel conditions to cancel a restricted mode state of a throttle actuator having received an abnormal signal are a solution of an abnormality of an internal combustion engine causing an abnormal signal, and an operation lever is positioned in the neutral position or in a low speed position corresponding to a target throttle opening angle. When an abnormality of an internal combustion engine is solved and a normal mode is recovered, unexpected acceleration of a boat can be prevented.

In still another embodiment, when receiving an abnormal signal from an engine controller, an actuator control device operates the shift actuator to set a shift of an abnormal internal combustion engine to the neutral position based on the abnormal signal. Because a revolution of the internal combustion engine is not transmitted to a screw, damage to the internal combustion engine caused by a forceful rotation can be prevented.

Still another embodiment includes a remote control system of an internal combustion engine for a boat described in the above. Therefore, a simple and sure control to reduce an engine speed of the internal combustion engine by adjusting a throttle opening angle is realized by a simple modification of software programs of an electronic control device on an internal combustion engine side and of the electronic control device on a remote control device side. As a result, an expensive dedicated circuit to realize a complicated ignition failure control is not required, and the cost of adopting a new control method can be reduced. In addition, because it is easy to connect the electronic control device on each remote control device side to each other by a communication circuit and to adopt a dedicated communication protocol, the reliability and response can be enhanced, so that speed of revolution of the internal combustion engine in an abnormal propulsion unit and of the internal combustion engine in a normal propulsion unit can be reduced promptly and surely.

DETAILED DESCRIPTION OF THE PREFERRED EMBODIMENTS

An embodiment is hereinafter described in details with reference to the accompanying figures.

Figure 1:
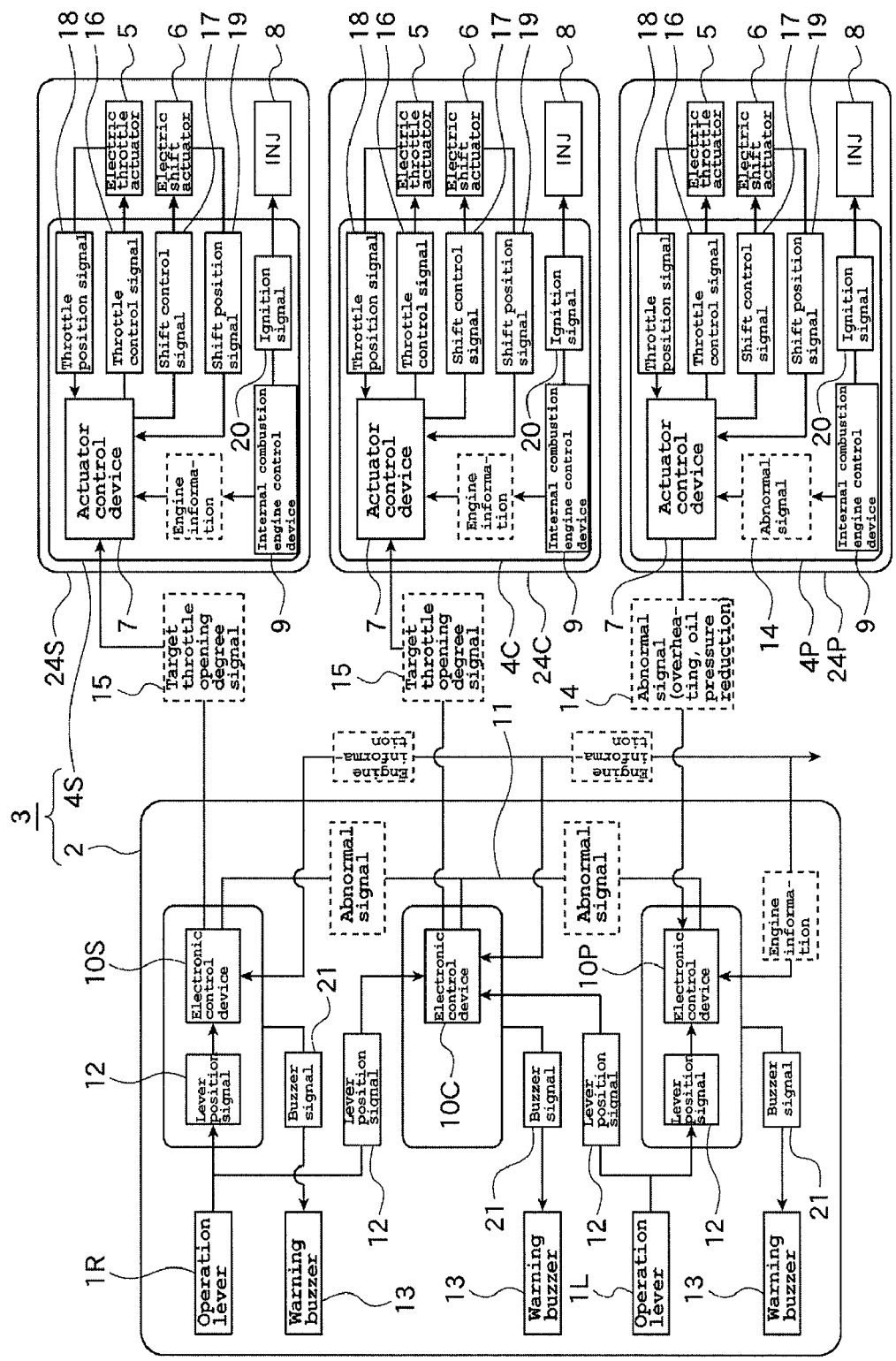
FIG. 1 is a function block diagram of a remote control system of an internal combustion engine for a boat relating to an embodiment.
Figure 2:
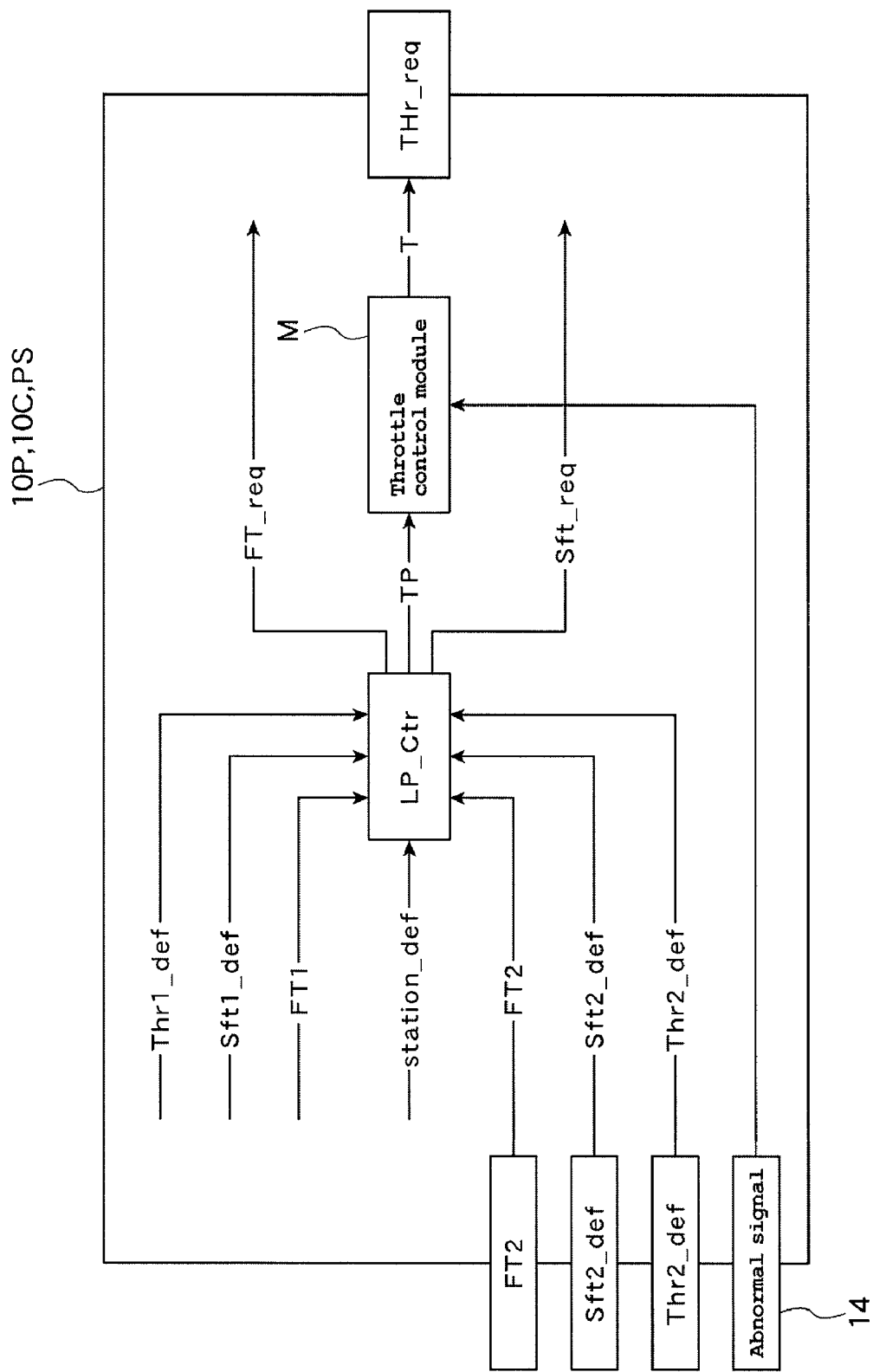
FIG. 2 is a data flow diagram of an electronic control device on a remote control device side of a remote control system of an internal combustion engine for a boat relating to an embodiment.
Figure 3:
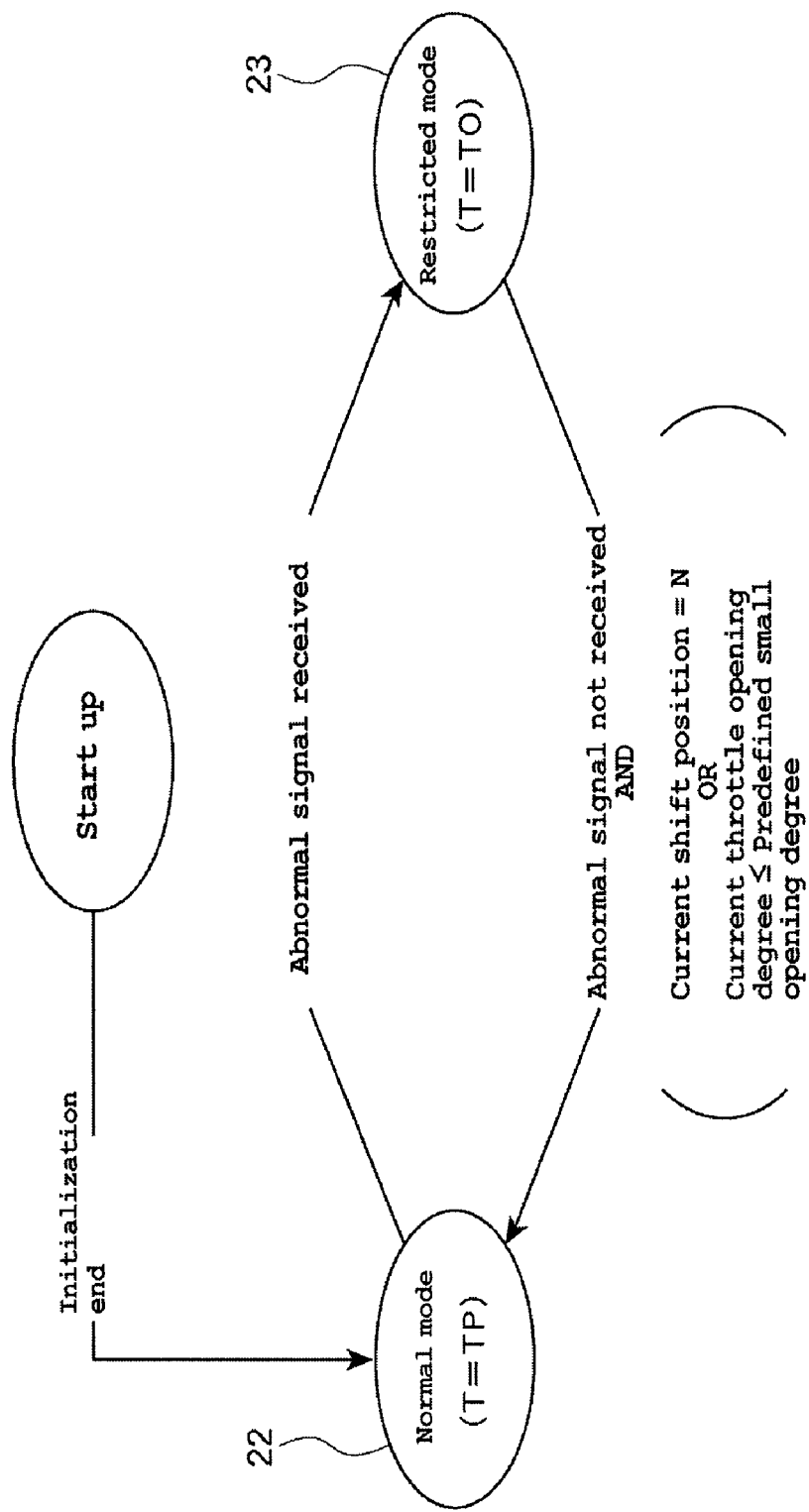
FIG. 3 is a state transition chart of a throttle restriction module of a remote control system of an internal combustion engine for a boat relating to an embodiment.
Figure 4:
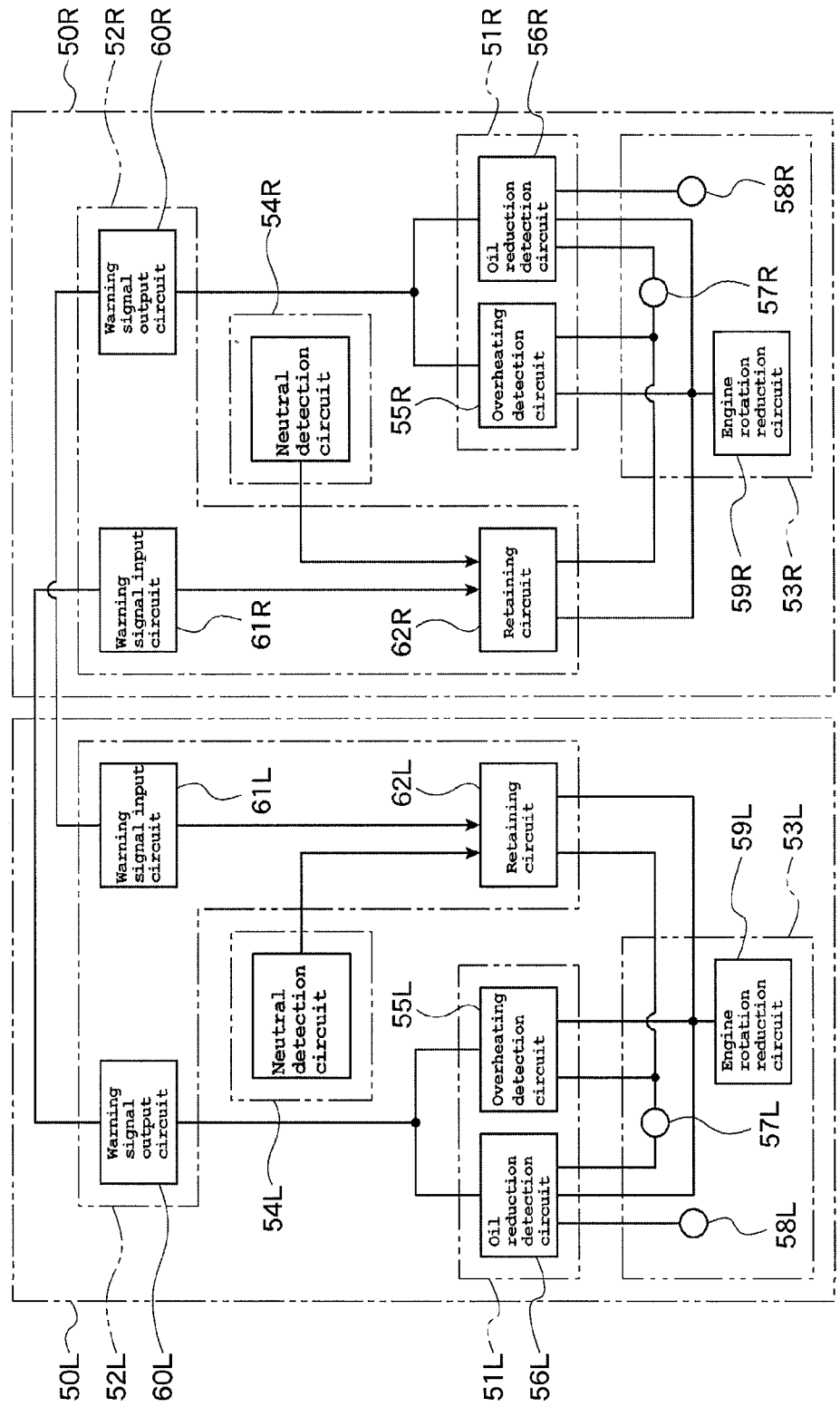
FIG. 4 is a function block diagram of a control system of an internal combustion engine for a boat.

FIG. 1 illustrates a function block diagram of a remote control system of an internal combustion engine for a boat relating to an embodiment. FIG. 2 illustrates a data flow diagram of an electronic control device on a remote control device side of a remote control system of an internal combustion engine for a boat relating to an embodiment. FIG. 3 illustrates a state transition chart of a throttle restriction module of a remote control system of an internal combustion engine for a boat relating to an embodiment.

As shown in FIG. 1, in one embodiment, three propulsion units can be installed on a boat. The function block diagram shows that the remote control system 3 can be equipped with the remote control device 2 capable of executing a remote control of a drive state of the three propulsion units with the two operation levers 1R, 1L. FIG. 1 illustrates the remote control device 2 of a main console because a remote control device of the main console and a remote control device of an upper console can be switched for use when a boat is equipped with the main console and the upper console in a position higher than the main console, where a fine view is obtained, and one remote control device 2 is installed at each of the main console and the upper console.

From the upper right to the lower right in FIG. 1, the electronic control device 4S on an internal combustion engine side can be installed in the starboard side propulsion unit 24S, the electronic control device 4C on the internal combustion engine side can be installed in the center propulsion unit 24C, and the electronic control device 4P on the internal combustion engine side can be installed in the port side propulsion unit 24P.

The electronic control devices 4S, 4C, and 4P on each internal combustion engine side have the actuator control device 7 to control an operation of the electric throttle actuator 5 that determines a drive state of the internal combustion engine of each of the propulsion units 24S, 24C, and 24P and an operation of the electric shift actuator 6 and the internal combustion engine control device 9 capable of controlling an ignition timing of the spark plug 8.

In the remote control device 2 installed in the main console, as many electronic control devices 10S, 10C, and 10P on a remote control device side as the corresponding electronic control devices 4S, 4C, and 4P on each internal combustion engine side can be installed, and the electronic control devices 10S, 10C, and 10P on each remote control device side can be connected via the communication circuit 11 by which a mutual communication is possible. In the embodiment, a CAN used for an automatic control of a vehicle is intentionally unused, and the communication circuit 11 and a dedicated communication protocol are adopted to prevent an intervention by other electric signals and to enhance reliability and response.

The electronic control devices 10S, 10C, and 10P on each remote control device side of the remote control device 2 can be connected to the actuator control device 7 of the electronic control devices 4S, 4C, and 4P on each internal combustion engine side and the internal combustion engine control device 9.

The remote control device 2 can be equipped with a lever position detector (not shown) to detect rotational operation positions of the operation levers 1R, 1L, and the operation state (the operation position) can be detected by a lever position detector (now shown) constantly. The lever position signal 12 corresponding to the detected value can be sent to the electronic control devices 4S, 4C, and 4P on the internal combustion engine side installed in the internal combustion engine of each of the propulsion units 24S, 24C, and 24P via the electronic control devices 10S, 10C, and 10P on a remote control device side. In addition, to the electronic control devices 10S, 10C, and 10P on each remote control device side of the remote control device 2, the warning buzzer 13 can be connected to indicate an abnormality of the internal combustion engine in each of the propulsion units 24S, 24C, and 24P.

The electronic control device 10S, 10C, and 10P on each remote control device side of the remote control device 2 can include the throttle control module M that can output the target throttle opening angle signal 15 to the electronic control devices 4S, 4C, and 4P on an internal combustion engine side to operate the electric throttle actuator 5 of a normal internal combustion engine to change an engine speed of another normal internal combustion engine to a certain low engine speed with the target throttle opening angle T0 when the abnormal signal 14 is received from the internal combustion engine control device 9 of the electronic control devices 4S, 4C, and 4P on an internal combustion engine side connected to the internal combustion engine causing an abnormality such as overheating or oil reduction as shown in FIG. 2.

The actuator control device 7 of the electronic control devices 4S, 4C, and 4P on each internal combustion engine side outputs the throttle control signal 16 to control an operation of the electric throttle actuator 5 according to an operation state (operation position) of the operation levers 1R, 1L and the shift control signal 17 to control an operation of the electric shift actuator 6. Operations of the electric throttle actuator 5 and the electric shift actuator 6 can be constantly monitored by each position detecting sensor (not shown). As a result, the throttle position signal 18 corresponding to a throttle opening angle and the shift position signal 19 indicating a shift position such as going forward, in neutral, and going backward can be sent to the actuator control device 7 as feedback.

The internal combustion engine control device 9 of the electronic control devices 4S, 4C, and 4P on each internal combustion engine side outputs the ignition signal 20 to execute an ignition of the spark plug 8 at an optimum timing programmed beforehand.

As described above, the electronic control devices 4S, 4C, and 4P on each internal combustion engine side realize a target shift position (forward, neutral, backward) corresponding to the operation state (operation position) and an engine speed of an internal combustion engine when the operation levers 1R, 1L are operated by a function of the actuator control device 7 and the internal combustion engine control device 9.

A process of an embodiment is now described.

For example, when an abnormality such as overheating or oil reduction occurs in an internal combustion engine installed to the port side propulsion unit 24P as shown in FIG. 1, the internal combustion engine control device 9 of the electronic control device 4P on an internal combustion engine side connected to the abnormal internal combustion engine detects an abnormality and outputs the abnormal signal 14 to the actuator control device 7.

The throttle opening angle T of an internal combustion engine installed to the normally operating propulsion unit 24P on the port side is set to the throttle opening angle TP as a result of an operation of the operation levers 1R, 1L. When an abnormality occurs, the actuator control device 7, on receiving the abnormal signal 14 from the internal combustion engine control device 9 of the electronic control device 4P on the internal combustion engine side connected to the abnormal internal combustion engine, compares the target throttle opening angle T0 programmed beforehand, which sets a certain low engine speed of an internal combustion engine, and the throttle opening angle T of an abnormal internal combustion engine in the port side propulsion unit 24, which is obtained from the internal combustion engine control device 9. If the two throttle opening angles are different, the electric throttle actuator 5 is operated to change the throttle opening angle T of an abnormal internal combustion engine in the port side propulsion unit 24P to the target throttle opening angle T0. In this case, a desirable predefined low engine speed is the engine speed of 600 to 1500 rpm used for an idling because engine sound is minimized and an operator does not fail to notice a warning sound of the warning buzzer 13.

When the abnormal signal 14 output by the internal combustion engine control device 9 of the electronic control device 4P on an internal combustion engine side connected to the abnormal internal combustion engine in the port side propulsion unit 24P is received by the electronic control device 10P on a remote control device side connected to the internal combustion engine control device 9 of the electronic control device 4P on the internal combustion engine side of the abnormal internal combustion engine in the port side propulsion unit 24P, the electronic control devices 10C and 10S on another remote control device side in a state capable of mutually communicating with the electronic control device 10P on a remote control device side via the communication circuit 11 also receive the abnormal signal 14 simultaneously. This enables the electronic control device 10P on the remote control device side connected to the internal combustion engine control device 9 of the electronic control device 4P on an internal combustion engine side of the abnormal internal combustion engine in the port side propulsion unit 24P to output the buzzer signal 21, and the warning buzzer 13 corresponding to the abnormal internal combustion engine in the port side propulsion unit 24P makes a sound to inform an operator of an occurrence of an abnormality such as overheating and oil reduction in the internal combustion engine installed to the port side propulsion unit 24P.

When receiving the abnormal signal 14 via the electronic control device 10P on the remote control device side connected to the abnormal internal combustion engine in the port side propulsion unit 24P, the electronic control devices 10C and 10S on another remote control device side compares the target throttle opening angle T0 programmed beforehand, which sets a certain low engine speed of 600 to 1500 rpm for the internal combustion engine, and the throttle opening angle TP of the normal internal combustion engine obtained from the internal combustion engine control device 9 of the electronic control devices 4C and 4S on the internal combustion engine side connected to the normal internal combustion engine. If the two throttle opening angles are different, the target throttle opening angle signal 15 is transmitted to the actuator control device 7 of the electronic control devices 4C and 4S on the internal combustion engine side connected to a normal internal combustion engine to set the throttle opening angle T to the target throttle opening angle T0. When receiving the target throttle opening angle signal 15, the actuator control device 7 operates the electric throttle actuator 5 to change the throttle opening angle T of the normal internal combustion engine to the target throttle opening angle T0.

As described above, the remote control system of the internal combustion engine for the boat relating to an embodiment realizes a method to reduce engine speed of an abnormal internal combustion engine and a normal internal combustion engine to a certain low engine speed by simply and surely adjusting a throttle opening angle. In addition, this is realized by a simple modification of a software program to include the throttle restriction module M capable of executing such control into the existing electronic control devices 10S, 10C, and 10P on a remote control device side. Because an expensive dedicated circuit to realize a complicated ignition failure control is not required, a cost of adopting a new control method is reduced. Moreover, as the electronic control devices 10S, 10C, and 10P on each remote control device side are connected with each other by the communication circuit 11 and a dedicated communication protocol is adopted, reliability and response are enhanced. Therefore, engine speed of the internal combustion engine in an abnormal propulsion unit and the internal combustion engine in a normal propulsion unit are reduced promptly and surely.

After an abnormality of an internal combustion engine is solved, the remote control system 3 of an internal combustion engine for a boat relating to an embodiment needs to be returned to the normal mode 22, which is a normal drive state. In an embodiment, the cancel conditions to cancel a state of the restricted mode 23 of the electric throttle actuator 5 having received the abnormal signal 14 are a solution to the abnormality of the internal combustion engine causing the abnormal signal 14 and the operation levers 1R, 1L positioned in the neutral position or in a position corresponding to a target throttle opening angle.

When receiving the abnormal signal 14 from the internal combustion engine control device 9, the actuator control device 7 controls the electric shift actuator 6 to set a shift position of the abnormal internal combustion engine in neutral based on the abnormal signal 14. This surely prevents a forceful revolution from damaging the internal combustion engine by inhibiting a transmission of revolution of the internal combustion engine to a screw.

For a boat equipped with the remote control system 3 of an internal combustion engine for a boat relating to an embodiment, a simple and sure control to reduce an engine speed of the internal combustion engine by adjusting a throttle opening angle is realized by a simple modification of software programs of the electronic control devices 4P, 4C, and 4S on an internal combustion engine side and the electronic control devices 10S, 10C, and 10P on a remote control device side. Therefore, because an expensive dedicated circuit to realize a complicated ignition failure control is not required, a cost of adopting a new control method can be reduced. In addition, as it is simple to connect the electronic control devices 10S, 10C, and 10P on each remote control device side with each other via the communication circuit 11 and to adopt a dedicated communication protocol, reliability and response are enhanced. As a result, engine speed of the internal combustion engine in an abnormal propulsion unit and of the internal combustion engine in a normal propulsion unit are reduced promptly and surely.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A control system for internal combustion engines in a boat equipped with a plurality of propulsion units, the control system comprising:

a plurality of electronic control devices on an internal combustion engine side of each internal combustion engine, each of the plurality of electronic control devices programmed to control an operation of a throttle actuator of the internal combustion engine, an operation of a shift actuator, and an ignition timing of a spark plug of the boat; and a remote control device comprising a plurality electronic control devices, which communicate with each other, on a remote control device side corresponding in number to the plurality of electronic control devices on the internal combustion engine side and programmed to transmit a signal to each internal combustion engine to execute a target drive state; wherein when an abnormality in an internal combustion engine in a propulsion unit occurs, an electronic control device on the internal combustion engine side connected to the abnormal internal combustion engine detects the abnormality and outputs an abnormal signal transmitting a target throttle opening angle signal to the throttle actuator to set a throttle opening angle of the abnormal internal combustion engine to a predetermined opening angle;

the abnormal signal is transmitted to an electronic control device on the remote control device side of a normal internal combustion engine via an electronic control device on the remote control device side of the abnormal internal combustion engine; and the electronic control device on the remote control device side of the normal internal combustion engine, on receiving the abnormal signal, transmits the target throttle opening angle signal or the abnormal signal to the electronic control device on the internal combustion engine side of the normal internal combustion engine such that an engine speed of the abnormal internal combustion engine and the normal internal combustion engine are reduced.

2. A control system according to claim 1, wherein the abnormality comprises at least one of overheating and oil reduction in the abnormal internal combustion engine.

3. A control system according to claim 1, wherein the engine speed is reduced to a predetermined amount.

4. A control system according to claim 1, wherein the electronic control device on the internal combustion engine side includes an actuator control device programmed to control the operation of the throttle actuator and the operation of the shift actuator, and an engine controller programmed to control the ignition timing of the spark plug, wherein
when the actuator control device receives the abnormal signal from the engine controller, the target throttle opening angle corresponding to the target throttle opening angle signal and a throttle opening angle of the abnormal internal combustion engine are compared, and
the throttle actuator is operated to change the throttle opening angle of the abnormal internal combustion engine to the target throttle opening angle if the two throttle opening angles are different.

5. A control system according to claim 4, wherein the actuator control device operates the shift actuator to set a shift position of the abnormal internal combustion engine to a neutral position based on the abnormal signal when having received the abnormal signal from the engine controller.

6. A control system according to claim 1, wherein when receiving the abnormal signal, the electronic control device on the remote control device side sounds a warning buzzer.

7. A boat comprising:
the control system according to claim 1.

8. A control system according to claim 1, wherein when receiving the abnormal signal, the electronic control device on the remote control device side compares the target throttle opening angle and a throttle opening angle of the normal internal combustion engine, and, if the two throttle opening angles are different, transmits a target throttle opening angle signal to the actuator control device to set the throttle opening angle to the target throttle opening angle so that the actuator control device operates the throttle actuator to change a throttle opening angle of the normal internal combustion engine to the target throttle opening angle.

9. A control system according to claim 8, wherein when receiving the abnormal signal, the electronic control device on the remote control device side sounds a warning buzzer, and the target throttle opening angle signal controls the engine speed of the internal combustion engines.

10. A control system according to claim 8, wherein the actuator control device operates the shift actuator to set a shift position of the abnormal internal combustion engine to a neutral position based on the abnormal signal when having received the abnormal signal from the engine controller.

11. A boat comprising:
the control according to claim 8.

12. A control system according to claim 1, wherein when receiving the abnormal signal, the electronic control device on the remote control device side sounds a warning buzzer installed in the remote control device or in the vicinity thereof, and the target throttle opening angle signal controls the engine speed of the internal combustion engines.

13. A control system according to claim 12, wherein conditions to cancel a restricted mode state of the throttle actuator having received the abnormal signal include resolving the abnormality of the internal combustion engine causing the abnormal signal, and positioning an operation lever in a neutral position or in a low speed position corresponding to the target throttle opening angle.

14. A boat comprising:
the control system according to claim 13.

15. A control system according to claim 1, wherein conditions to cancel a restricted mode state of the throttle actuator having received the abnormal signal include resolving the abnormality of the internal combustion engine causing the abnormal signal, and positioning an operation lever in a neutral position or in a low speed position corresponding to the target throttle opening angle.

16. A boat comprising:
the control system according to claim 15.

17. A remote control system for internal combustion engines in a boat equipped with a plurality of propulsion units, the remote control system comprising:
an electronic control device on an internal combustion engine side of each internal combustion engine, the electronic control devices programmed to control a plurality of operations of the internal combustion engines; and
a remote control device comprising electronic control devices, which communicate with each other, on a remote control device side corresponding in number to the electronic control devices on the internal combustion engine side and programmed to transmit a signal to each internal combustion engine to execute a target drive state, wherein
when an abnormality in an internal combustion engine in a propulsion unit occurs, an electronic control device on the internal combustion engine side connected to the abnormal internal combustion engine detects the abnormality and outputs an abnormal signal transmitting a control signal to control at least a portion of the internal combustion engine;
the abnormal signal is transmitted to an electronic control device on the remote control device side of a normal internal combustion engine via an electronic control device on the remote control device side of the abnormal internal combustion engine, and
the electronic control device on the remote control device side of the normal internal combustion engine, on receiving the abnormal signal, transmits the control signal or the abnormal signal to the electronic control device on the internal combustion engine side of the normal internal combustion engine, such that an engine speed of the abnormal internal combustion engine and the normal internal combustion engine are reduced.

18. A remote control system according to claim 17, wherein the plurality of operations of the internal combustion engine comprise an operation of a throttle actuator of an internal combustion engine for each propulsion unit, an operation of a shift actuator, and an ignition timing of a spark plug of the boat.

19. A remote control system according to claim 17, wherein the control signal comprises a target throttle opening angle signal to the throttle actuator to set a throttle opening angle of the abnormal internal combustion engine to a predetermined opening angle.

* * * * *